(12) United States Patent
Simpson et al.

(10) Patent No.: US 6,986,976 B2
(45) Date of Patent: Jan. 17, 2006

(54) LIQUID ELECTROPHOTOGRAPHIC INKS OR TONERS HAVING REDUCED ODORS

(75) Inventors: Charles W. Simpson, Lakeland, MN (US); James A. Baker, Hudson, WI (US); A. Kristine Fordahl, Hopkins, MN (US); Susan E. Hill, Woodbury, MN (US)

(73) Assignee: Samsung Electronics Co., Ltd., Suwon (KR)

( * ) Notice: Subject to any disclaimer, the term of this patent is extended or adjusted under 35 U.S.C. 154(b) by 70 days.

(21) Appl. No.: 10/653,001

(22) Filed: Aug. 29, 2003

(65) Prior Publication Data

US 2004/0115555 A1 Jun. 17, 2004

Related U.S. Application Data

(60) Provisional application No. 60/422,898, filed on Oct. 31, 2002.

(51) Int. Cl.
*G03G 9/125* (2006.01)

(52) U.S. Cl. .................. 430/115; 430/116; 430/137.22
(58) Field of Classification Search ................ 430/115, 430/116, 137.22
See application file for complete search history.

(56) References Cited

U.S. PATENT DOCUMENTS

| | | | |
|---|---|---|---|
| 3,542,682 A | 11/1970 | Mutaffis .................... 252/62.1 |
| 3,991,226 A | 11/1976 | Kosel .......................... 427/17 |
| 4,019,911 A | 4/1977 | Vijayendran et al. ......... 106/23 |
| 4,065,304 A | 12/1977 | Johnston et al. ................ 96/1 |
| 4,476,210 A | 10/1984 | Croucher et al. ........... 430/114 |
| 5,018,974 A | 5/1991 | Carnahan et al. .............. 434/98 |
| 5,126,224 A | 6/1992 | Hyosu et al. ............. 430/106.6 |
| 5,492,788 A | 2/1996 | Denton et al. .............. 430/137 |
| 5,521,268 A | 5/1996 | Ghyzel et al. .............. 526/224 |
| 5,577,947 A | 11/1996 | Malloy et al. .............. 446/220 |
| 5,970,300 A | 10/1999 | Acquaviva .................. 399/341 |
| 5,975,675 A | 11/1999 | Kim ............................ 347/20 |
| 6,057,072 A | 5/2000 | Guistina et al. ............ 430/106 |
| 6,123,757 A * | 9/2000 | Yang et al. .............. 106/31.02 |
| 6,180,692 B1 | 1/2001 | Bridgeman et al. ......... 523/161 |
| 6,261,347 B1 | 7/2001 | Moreland ................ 106/31.02 |
| 6,287,741 B1 * | 9/2001 | Marko ........................ 430/115 |
| 2002/0011180 A1 | 1/2002 | Miyamoto et al. ....... 106/31.58 |
| 2003/0005853 A1 | 1/2003 | Leu et al. ................. 106/31.02 |
| 2003/0022082 A1 | 1/2003 | Ohmura et al. ............. 430/105 |
| 2003/0076393 A1 | 4/2003 | Lee et al. .................... 347/100 |
| 2003/0094117 A1 | 5/2003 | Sir et al. ................. 106/31.02 |

FOREIGN PATENT DOCUMENTS

| | | |
|---|---|---|
| DE | 3720791 A1 | 6/1987 |
| EP | 0305118 A2 | 3/1989 |
| EP | 0417812 A2 | 3/1991 |
| EP | 1002840 A1 | 5/2000 |
| JP | XP002265206 | 1/2001 |
| WO | WO 01/79364 A2 | 10/2001 |

\* cited by examiner

*Primary Examiner*—John L Goodrow
(74) *Attorney, Agent, or Firm*—Mark A. Litman & Associates, P.A.

(57) ABSTRACT

Electrophotographic ink compositions display reduced malodor effects when at least one antagonistic odor vector compound for $C_{10}$, $C_{11}$ and $C_{12}$ hydrocarbons is present in the ink composition. The use of appropriate amounts of the antagonistic odor vector compounds for $C_{10}$, $C_{11}$ and $C_{12}$ hydrocarbons does not adversely affect the functional imaging properties of the ink.

14 Claims, No Drawings

LIQUID ELECTROPHOTOGRAPHIC INKS OR TONERS HAVING REDUCED ODORS

This application claims the benefit of Provisional Application No. 60/422,898, filed Oct. 31, 2002.

BACKGROUND OF THE INVENTION

1. Field of the Invention

The present invention relates to an electrophotographic apparatus using liquid toners and particularly to a liquid ink or toner containing an organoleptic odor maskant or odor neutralizer.

2. Background of the Art

Liquid toners used in electrophotographic printing systems and devices generally comprise of carrier liquid, polymeric binder, colorant, and an optional charge control agent. Liquid electrophotography is a process in which a charged photoreceptive element is struck with radiation, particularly light, causing the exposed areas to discharge to form a latent electrostatic image pattern. Liquid toner held in a developing station is transferred to the discharged areas, developing the latent electrostatic image. The developed image may then be transferred to a final image receptor, or to an intermediate transfer member, with subsequent transfer to a final image receptor. Since liquid carrier is not desired on the final printed substrate, it is necessary to remove the liquid at some time prior to the viewing availability of the final image. Without removal of the carrier, the image would be unlikely to be stable against abrasion, remaining in a soft or even liquid state.

The carrier liquid, which may be essentially odorless in small quantities in the liquid form of the toner or ink, may be found to be offensive under other circumstances. For example, the strength or nature of the odor may be undesirable in larger quantities of the carrier; as the toner (including the carrier liquid) is circulated through the developer station; or during the carrier liquid removal step (e.g., by evaporation), regardless of where that may take place.

In the electrophotographic printing apparatus, probably the greatest source of offensive or troublesome odors is in the step in which the carrier liquid is evaporated from or dried from the image after deposition on a surface. In many cases, this evaporation step occurs in a fusing apparatus, which not only serves to evaporate the solvent, but heats the toner particles, allowing them to flow into and bond with the paper and themselves. During fusing, the ink, comprising carrier liquid, is heated quickly to a high temperature, causing all or substantially all (by substantially all is meant the removal of that amount of the carrier that enables the image to meet stability requirements) carrier liquid to evaporate quickly. Depending on the temperature used to evaporate the carrier, tiny airborne droplets of aerosol mist (airborne carrier solvent) may be formed. This sudden influx of airborne carrier through either vapor or aerosol mist can have odors associated with it for many reasons. Either the carrier itself may have an odor, or the droplets pick up other materials from the ink which may have odors.

In some applications, it is desirable for ink to have a pleasant odor, or scent. Children's pens and markers, for example, are frequently infused with fruity and floral scents that tend to coordinate with the ink color selected. Balloons and cards are also printed with scented inks to give the articles a scent, without having to create the scent in the actual article.

U.S. Pat. No. 4,065,304 discloses a fruit-shaped ball point pen that emits the scent characteristic of its shape. U.S. Patent Application No. 20020011180 (Jan. 31, 2002) discloses water-based scented pens where the scent remains even when the ink is dry.

Other novelty uses for scented ink include children's coloring books that release fragrance when colored (U.S. Pat. No. 5,018,974), scented balloons (U.S. Pat. No. 5,577,947), scented pages (U.S. Pat. Nos. 5,975,675; and 5,970,300) and scented greeting cards (U.S. Pat. No. 6,261,347).

Dry toners often have a problem with the smell of styrene or other unpleasant odors and various means are known for reducing or eliminating those smells (U.S. Pat. Nos. 5,126,2224; 5,521,268; 6,157,072; and U.S. Patent Application No. 20030022082). Ink jet scent additives are also known (U.S. Pat. Nos. 6,180,692; 6,123,757; and U.S. Patent Application Nos. 20030005853; 20030076393; and 20030094117).

Odors caused by ozone and other product ingredients are moderated by the use of a specific class of deodorant. The deodorant contains a plant extract preferably usable in the invention is prepared from green tea, the crushed raw leaf of green tea is immersed in ethanol. Thus obtained ethanol extract which contains a catechin, a vitamin, a sugar and an enzyme is filtered and concentrated to obtain the deodorant containing the plant extract relating to the invention.

Most of the instances in the prior art have been designed to impart a subjectively determined "pleasant" smell in a printing or writing apparatus or on an article on which such an apparatus prints. Little is known about odor neutralizing vectors or the technology behind eliminating unpleasant smells while leaving no or little fragrance behind.

SUMMARY OF THE INVENTION

In a printing apparatus that is intended for use in a home or office environment, the presence of odors, whether "pleasant" or "offensive," is generally perceived as a drawback, in part due to differences in personal preference and the greater potential or frequency of allergies with exposure to larger numbers of people or in smaller areas. It is therefore preferred that an odor elimination method be provided for the dissipation or neutralization of offensive carrier liquid odors. Rather than masking specific undesirable odors with other odors, the system should not itself have a strong or easily noticeable scent. Scented oils are well known, typically odor maskants. Odor maskants work by evaporating, heating or spraying the maskants, allowing the solid or liquid scent to become a gas that enters the room or area. Odor maskants work by covering up present odors with a different scent, the masking scent often being required in a concentration that is close to or greater than the concentration of the offensive odor. Other products are available to neutralize or eliminate odor without leaving much of their own scent behind, such as some water-based clothing sprays. These odor neutralizers attempt to counteract the chemical or bacteria that is causing odor at the source. The main purpose of an odor neutralizer is to leave a room or area with as little smell (positive or negative) as possible.

It is not enough to simply dump any quantity of a known odor maskant or neutralizer into liquid toner to reduce or eliminate smells. Liquid toner is carefully blended and constructed to have certain chemical, physical, and charging properties, and any additions have the potential to harm that delicate balance. Another important consideration is the evaporation characteristics of the odor maskant or neutralizer. If the primary odors are coming from the carrier liquid as it is evaporated, it is important that the odorant evaporate at approximately the same temperature and achieve approximately the same droplet size as the carrier liquid. In that way, the odorant maskant or neutralizer will be able to affect the odor as it is created. It is not likely that 100% of all odors could be eliminated with any one product or method, but it is an object of this invention to substantially reduce carrier liquid odor perception by using chemical additive(s). A final concern is the actual odor of the chemical additive itself. It is not satisfactory to simply cover one odor with a strong odor. Substantial differences in olfactory preferences would make agreement upon a preferred smell nearly impossible.

One aspect of the present invention is a method of substantially reducing evaporated carrier liquid odors, especially by using vector maskants effective for or specific for $C_{10}$, $C_{11}$ and $C_{12}$ hydrocarbons.

DETAILED DESCRIPTION OF THE INVENTION

There is some very limited knowledge in the general arts that specific vapor phase materials have beneficial effects on masking specific odors. This knowledge tends to be limited to lore or well published notices. For example, it is well known that vanilla flavoring (usually set in a dish open to the ambient environment) will mask undesirable and persistent odors from cooking fish (which emits fish oils into the air).

It is the belief and finding of Applicants that odors, as with many other sensations, have vectors associated with them. That is, odors create specific and reproducible stimuli on the olfactory system of humans, and that is why odors are familiar to individuals. Each odor produces a specific stimuli or vector each time the same person is exposed to that odor. It is therefore thought to be possible to produce at least one negative stimulus that balances out or cancels the specific stimulus produced by a specific vapor. The components or at least one component of vanilla extract is believed to be an unrecognized antagonistic vector for odorous fish oils.

An antagonistic odor vector is defined in the practice of the present invention as a chemical compound or combination of compounds that, in a vapor phase, will reduce or counter olfactory sensations produced by specific materials. An antagonistic vector according to the present invention must be able to reduce or counter olfactory sensations produced by at least one of $C_{10}$, $C_{11}$ and $C_{12}$ linear hydrocarbons, and preferably at least all three of $C_{10}$, $C_{11}$ and $C_{12}$ linear hydrocarbons.

It is not always enough that a masking agent is found for a specific adverse aroma, or even that an antagonistic odor vector is found, for the antagonistic odor vector must leave an acceptable residual background odor, must be useful under conditions that are compatible with the environment where the original adverse odor is found or generated, it must be non-toxic to humans, and it must remain in the vapor phase under the conditions of use and not redeposit on local surfaces.

The present invention has found that antagonist odor vectors for $C_{10}$, $C_{11}$ and $C_{12}$ hydrocarbons are available in the marketplace, and that these materials can be added directly to electrophotographic inks or toners to reduce adverse odor effects from $C_{10}$, $C_{11}$ and $C_{12}$ hydrocarbons and not damage the performance of the inks or toners. This last feature is extremely important, and no previous work on this vector cancellation or reduction phenomenon is known.

In the practice of the present invention, a liquid electrophotographic ink is provided comprising a liquid carrier, having a Kauri-Butanol number less than 30, a polymeric binder, a colorant, and a non-toxic antagonistic odor vector for $C_{10}$, $C_{11}$ and $C_{12}$ hydrocarbons. The antagonistic odor vector is preferably provided in concentrations in the range of less than 100 parts per million (ppm) by weight of the active vector compound as compared to the total amount (by weight) of the $C_{10}$, $C_{11}$ and $C_{12}$ hydrocarbons.

Another consideration that can influence the selection of antagonistic odor vectors is the ability of the vector to evaporate from the liquid electrophotgraphic toner at a rate that maintains a desired balance of the respective concentrations of the vector and the $C_{10}$, $C_{11}$ and $C_{12}$ hydrocarbons, both in the air and in the supply of ink or toner. This can be effected, for example, by having in the liquid carrier, having a Kauri-Butanol number less than 30 and a vapor pressure measured in mm Hg at 60° C., the antagonistic odor vector that has a vapor pressure in mm of Hg at 60° C. within the range of 40–160%, preferably within 60%–140% the vapor pressure of the $C_{10}$, $C_{11}$ and $C_{12}$ hydrocarbons. The antagonistic odor vector should also be soluble in the liquid carrier. The antagonistic odor vector for the $C_{10}$, $C_{11}$ and $C_{12}$ hydrocarbons may preferably be carried or is soluble in an oil. The liquid electrophotographic ink may have the carrier specific ($C_{10}$, $C_{11}$ and $C_{12}$ hydrocarbons) antagonistic odor vector present in the ink at an absolute ratio of, by way of non-limiting examples, between 10 ppm and 20,000 ppm, preferably between 10 ppm and 250 ppm, more preferably between 10 and 150 ppm.

The ink may contain all of the other traditional components of the known inks and toners, including surface active agents, colorants (e.g., dyes and pigments), thickening agents, electrical control agents, reactive components (e.g., reactive binding or crosslinking agents), and the like.

Among the specific classes of chemicals that have antagonistic odor vector capabilities are terpenoids, ionones, pentenones, cyclopentadecanones, ketones generically, and specifically cyclic ketones, unsaturated ketones, bicyclic ketones, and linear ketones, cyclohexanecarboxylates, benzoyl benzoates, alkanoyl benzoates, alpha-keto esters, 2-indanmethanol and its derivatives, substituted cycloheanols, (tetra-hydrocarbyl-substituted-phenyl)alkanes, dihydrobenzofuranones, alkyl-substituted pyridine, campholinic aldehyde derivatives, macrocylcic lactones, and the like. Samples of disclosures of these and other materials may be found in U.S. Pat. Nos. 5,527,769; 5,538,944; 5,559,272; 5,614,486; 5,679,634; 5,696,075; 5,760,277; 5,792,740; 5,858,958; 5,871,721; 5,939,368; 5,952,292; 6,022,531; 6,133,228; 6,169,212; 6,177,400; 6,323,173; and 6,369,026 to support enablement of the manufacture of these classes of compounds.

The invention also describes a method of reducing odor emitted from an electrographic ink comprising mixing a) a liquid carrier having a Kauri-Butanol number less than 30 and comprising at least some $C_{10}$, $C_{11}$ and $C_{12}$ hydrocarbons, b) a polymeric binder, c) a colorant, and d) a fluid material having an antagonistic odor vector for $C_{10}$, $C_{11}$ and $C_{12}$ hydrocarbons. Again, by way of non-limiting examples, the fluid material (preferably liquid, but gases may be dissolved in the carrier, especially if they are highly soluble and reduce evaporation from the carrier to a sufficient degree) having an antagonistic odor vector is selected from the group consisting of terpenoids, ionones, pentenones, cyclopentadecanones, ketones, cyclohexanecarboxylates, benzoyl benzoates, alkanoyl benzoates, alpha-keto esters, 2-indanmethanol and its derivatives, substituted cycloheanols, (tetra-hydrocarbyl-substituted-phenyl)alkanes, dihydrobenzofuranones, alkyl-substituted pyridine, campholinic aldehyde derivatives, and macrocylcic lactones. The fluid (when dissolved) and particularly as a liquid should have a vapor pressure at 25° C. that is within 25% of the vapor pressure of the liquid carrier.

"Kauri-Butanol" refers to an ASTM Test Method D1133-54T. The Kauri-Butanol Number (KB) is a measure of the tolerance of a standard solution of kauri resin in 1-butanol to an added hydrocarbon diluent and is measured as the volume in milliliters (mL) at 25 degree. C. of the solvent required to produce a certain defined degree of turbidity when added to 20 g of a standard kauri-1-butanol solution. Standard values are toluene (KB=105) and 75% by volume of heptane with 25% by volume toluene (KB=40). There is an approximately linear relationship between the Hildebrand solubility parameter and the KB number for hydrocarbons: Hildebrand Solubility Parameter (Ma.sup. ½)=2.0455[6.3+0.03 KB (mL)].

The toner compositions of the invention can be provided by blending the component with the antagonistic odor vector capability into the carrier at any point in the compounding procedure. For example, the antagonistic odor vector capability may be blended first into the carrier, last into the carrier, or intermediate in the addition of the various ingredients that are added to the toner system. By way of a non-limiting example, where combining a) carrier liquid, b) material with antagonistic odor vector capabilities, c) pigment/binder/charge direction particles, and d) surfactant (other materials may of course be present), the order of combination may be any of:

a)+b)+c)+d);
b)+d)+a)+c);
c)+a)+b)+d);
d)+a)+b)+c); etc.

Other materials may also be added at various times in the procedure. The material antagonistic odor vector capabilities may be inserted into a dispersion, mixed with the carrier to form a solution, injected or mixed with agitation, and the like.

EXAMPLES

Introduction

Odor-neutralizing additives and oils were obtained from various companies including: two proprietary samples of Formulair Additive, manufactured by Odorchem Manufacturing Corp., Surry, B.C. Canada; a custom-blended proprietary fragrance/neutralizer created by Alpha Aromatics, Fox Chapel, Pa.; and several proprietary blends of odor neutralizers from Firmenich, Plainsboro, N.J.

The additives were mixed with Norpar 12™ (from Exxon Corp.) at varying ratios and subjectively tested (smelled) to determine how much was excessive and how much was insufficient of each individual fragrance. The formulations that did not initially appear to neutralize the hydrocarbon smell were eliminated.

Example 1

The additives that continued on for further testing were tested in two ways. First, the odor neutralizers were mixed in with the liquid toner prior to printing. Page-sized blocks were then printed on paper and left unfused (the printed pages were placed in a plastic bag in the freezer so the carrier liquid would not evaporate). Random participants were pulled into the room to offer subjective opinions (via a survey) of their perception of the odors in the room as the pages were printed. This was done because if a neutralizer has a fragrance that is meant to disappear when the chemical is evaporated, that fragrance will be detected at the time of printing, when the toner is still a liquid.

It was found that some of the fragrances were overwhelming, so the tests were repeated with fewer ppms of the neutralizer. At that point, most people surveyed found that they could detect the fragrance, but that it was not offensive, or that they had to be very close to the printing apparatus to detect it.

Example 2

The bags of frozen samples were later removed from the freezer and allowed to come to room temperature before the toned image was fused (fixed) to the paper. In the fusing step, the hydrocarbons in the carrier liquid evaporate from the image when heat is applied, releasing the carrier liquid (and the odor neutralizer mixed with it) into the air in the form of vapor or mist. It is known that the lower carbon numbers have a stronger smell as they evaporate. More random participants came in to subjectively comment on the odors in the room as each test was run. The room used for the test was a small office that had the ventilation closed off so that all of the smells would remain in the room as long as possible.

The results of the testing were that each particular proprietary blend of chemicals/neutralizers has a range of effectiveness. Some of the blends worked effectively to reduce/eliminate hydrocarbon odors at ratios as low as 25 or 50 ppm. Others worked best at 1000 ppm or above. It was discovered that the perceived "strongness" of the scent included in the odor neutralizer will affect how much may be used. Overall, most people commented that the additives did seem to take away the offensive hydrocarbon smell. Other offensive smells, not meant to be neutralized, such as, "hot paper," "wet paper," or hot rubber are not neutralized by the hydrocarbon odor neutralizers.

Example 3

An additional variation on the test involved placing a few drops of the odor neutralizer, in liquid form, onto a hydrocarbon-absorbent sheet or into a bed of hydrocarbon-absorbing particulate that was being used to filter and trap evaporated hydrocarbons from an airstream in the fusing apparatus. Fans directed the hydrocarbon-laden air, after fusing, into the filter beds before blowing the air into the room. In this iteration, the fragrance associated with the neutralizer was more noticeable, and the effectiveness of the neutralizer was diminished. Many observers did note an improvement, however, no one thought that the hydrocarbon smell was completely banished using this technique.

What is claimed is:

1. A liquid electrophotographic ink comprising
   a liquid carrier, having a Kauri-Butanol number less than 30 and comprising at least some $C_{10}$, $C_{11}$ and $C_{12}$ hydrocarbons,
   a polymeric binder,
   a colorant, and
   a fluid material having an antagonistic odor vector for $C_{10}$, $C_{11}$ and $C_{12}$ hydrocarbons, wherein the hydrocarbons have a vapor pressure measured in mm Hg at 60° C., and the fluid material that has an antagonistic odor vector for the $C_{10}$, $C_{11}$ and $C_{12}$ hydrocarbons has a vapor pressure in mm of Hg at 60° C. within the range of 40–160% of the vapor pressure of the $C_{10}$, $C_{11}$ and $C_{12}$ hydrocarbons; and wherein the fluid material having an antagonistic odor vector is selected from the group consisting of terpenoids, ionones, pentenones, cyclopentadecanones, ketones, cyclohexanecarboxylates, benzoyl benzoates, alkanoyl benzoates, alpha-keto esters, 2-indanmethanol and its derivatives, substituted cycloheanols, (tetrahydrocarbyl-substituted-phenyl)alkanes, dihydrobenzofuranones, alkyl-substituted pyridine, campholinic aldehyde derivatives, and macrocylcic lactones.

2. The ink of claim 1 wherein the antagonistic odor vector has a vapor pressure at 60° C. measured as mm Hg that is within 60%–140% of the vapor pressure of at least one of $C_{10}$, $C_{11}$ and $C_{12}$ hydrocarbons.

3. The ink of claim 1 wherein the antagonistic odor vector is soluble in the liquid carrier.

4. The ink of claim 1 wherein the antagonistic odor vector is oil-soluble.

5. The ink of claim 1 wherein the antagonistic odor vector is present in relation to the total of all other components of the ink at a ratio between 10 ppm and 20,000 ppm.

6. The ink of claim 1 wherein the antagonistic odor vector is present in relation to the total of all other components of the ink at a ratio between 10 ppm and 200 ppm.

7. The ink of claim 1 wherein the fluid material is a liquid having a vapor pressure at 25° C. that is within 25% of the vapor pressure of the liquid carrier.

8. The ink of claim 2 wherein the fluid material is a liquid having a vapor pressure at 25° C. that is within 25% of the vapor pressure of the liquid carrier.

9. The ink of claim 3 wherein the fluid material is a liquid having a vapor pressure at 25° C. that is within 25% of the vapor pressure of the liquid carrier.

10. The ink of claim 4 wherein the fluid material is a liquid having a vapor pressure at 25° C. that is within 25% of the vapor pressure of the liquid carrier.

11. The ink of claim 5 wherein the fluid material is a liquid having a vapor pressure at 25° C. that is within 25% of the vapor pressure of the liquid carrier.

12. The ink of claim 6 wherein the fluid material is a liquid having a vapor pressure at 25° C. that is within 25% of the vapor pressure of the liquid carrier.

13. A method of reducing odor emitted from an electrographic ink comprising mixing a) a liquid carrier having a Kauri-Butanol number less than 30 and comprising at least some $C_{10}$, $C_{11}$, and $C_{12}$ hydrocarbons, b) a polymeric binder, c) a colorant, and d) a fluid material having an antagonistic odor vector for $C_{10}$, $C_{11}$ and $C_{12}$ hydrocarbons, wherein the hydrocarbons have a vapor pressure measured in mm Hg at 60° C., and the fluid material that has an antagonistic odor vector for the $C_{10}$, $C_{11}$ and $C_{12}$ hydrocarbons has a vapor pressure in mm of Hg at 60° C. within the range of 40–160% of the vapor pressure of the $C_{10}$, $C_{11}$ and $C_{12}$ hydrocarbons: and wherein the fluid material having an antagonistic odor vector is selected from the group consisting of terpenoids, ionones, pentenones, cyclopentadecanones, ketones, cyclohexanecarboxylates, benzoyl benzoates, alkanoyl benzoates, alpha-keto esters, 2-indanmethanol and its derivatives, substituted cycloheanols, (tetrahydrocarbyl-substituted-phenyl)alkanes, dihydrobenzofuranones, alkyl-substituted pyridine, campholinic aldehyde derivatives, and macrocylcic lactones.

14. The method of claim 13 wherein the fluid material is a liquid having a vapor pressure at 25° C. that is within 25% of the vapor pressure of the liquid carrier.

* * * * *